United States Patent [19]

Falling et al.

[11] Patent Number: 5,652,328

[45] Date of Patent: Jul. 29, 1997

[54] POLYETHER POLYMERS DERIVED FROM 3,4-EPOXY-1-BUTENE AND HYDROXYL INITIATOR

[75] Inventors: Stephen N. Falling, Kingsport, Tenn.; Stephen A. Godleski, Fairport, N.Y.; Patricia Lopez-Maldonado; Peter B. MacKenzie, both of Kingsport, Tenn.; Laughlin G. McCullough, Longview, Tex.; James C. Matayabas, Jr., Kingsport, Tenn.

[73] Assignee: Eastman Chemical Company, Kingsport, Tenn.

[21] Appl. No.: 489,091

[22] Filed: Aug. 17, 1995

Related U.S. Application Data

[62] Division of Ser. No. 181,733, Jan. 18, 1994, abandoned.
[51] Int. Cl.$^6$ ............................................. C08G 65/28
[52] U.S. Cl. ........................... 528/409; 525/409; 528/421
[58] Field of Search ................................ 528/421, 409; 525/403, 409; 568/616

[56] References Cited

U.S. PATENT DOCUMENTS

| | | | |
|---|---|---|---|
| 3,509,118 | 4/1970 | Vandenberg et al. | 260/88.3 |
| 3,714,265 | 1/1973 | Bader et al. | 568/616 |
| 3,755,197 | 8/1973 | Hsieh | 252/431 C |
| 4,962,237 | 10/1990 | Laycock | 568/616 |
| 5,238,889 | 8/1993 | Falling et al. | 549/507 |
| 5,315,019 | 5/1994 | Phillips et al. | 549/507 |

FOREIGN PATENT DOCUMENTS

| | | | |
|---|---|---|---|
| 2-305819 | 12/1990 | Japan | 568/616 |
| 1087292 | 10/1967 | United Kingdom | 568/616 |

*Primary Examiner*—Robert E. Sellers
*Attorney, Agent, or Firm*—J. Frederick Thomsen

[57] ABSTRACT

Disclosed are novel polyether compounds obtained by the reaction or polymerization of 3,4-epoxy-1-butene in the presence of an onium iodide compound such as an ammonium or phosphonium iodide, an organotin compound such as a trihydrocarbyltin iodide, and a nucleophilic initiator compound. The polyether compounds comprise n units of residue (1) and m units of residue (2), wherein the total value of n+m is 2 to 70, m/(n+m) is greater than 0.75 and up to 0.98, and residues (1) and (2) have the structures:

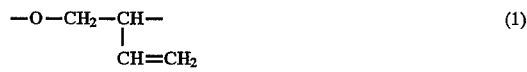

(1)

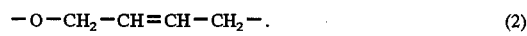

(2)

5 Claims, No Drawings

POLYETHER POLYMERS DERIVED FROM 3,4-EPOXY-1-BUTENE AND HYDROXYL INITIATOR

This is a divisional application of application Ser. No. 08/181,733, filed Jan. 18, 1994, abandoned.

This invention pertains to certain novel polyether compounds. More specifically, this invention pertains to polyether glycols and alcohols containing repeating units of the structure

and

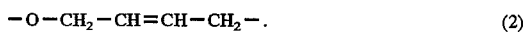

The polymerization and copolymerization of 3,4-epoxy-1-butene is known. For example, U.S. Pat. No. 2,680,109 discloses the polymerization of unsaturated 1,2-epoxides, including 3,4-epoxy-1-butene, using as catalyst stannic chloride containing a small amount of water. British Patent 869,112 and U.S. Pat. Nos. 3,031,439 and 3,417,064 disclose the copolymerization of 3,4-epoxy-1-butene with ethylene oxide and propylene oxide, using as catalyst strontium carbonate containing a small amount of water.

U.S. Pat. Nos. 3,158,705, 3,158,581, and 3,158,591 disclose the polymerization of 3,4-epoxy-1-butene to give polyethers consisting only of residue (1), using as catalyst trialkylaluminum compounds prereacted with water. These patents also disclose the copolymerization of 3,4-epoxy-1-butene with ethylene oxide, propylene oxide, and epichlorohydrin, using as catalyst trialkylaluminum compounds prereacted with water. U.S. Pat. No. 3,509,118 discloses the preparation of unsaturated polyether glycols containing only residue (1) prepared by n-butyl lithium cleavage of the high molecular weight polymers prepared by the polymerization of 3,4-epoxy-1-butene in benzene using triethylaluminum prereacted with water.

Tsuruta, et al., Macromol. Chem., 111, 236–246 (1968), disclose that diethylzinc prereacted with water polymerizes 3,4-epoxy-1-butene to give a 54% yield of high molecular weight polymer containing only residue (1). Tsuruta, et al., also disclose the isolation of a 3% yield of polymer from 3,4-epoxy-1-butene and anhydrous diethylzinc as catalyst having evidence of internal double bonds [residue (2)] by infrared spectroscopy. Our investigation of this chemistry resulted in no isolable polymer. S. S. Invachev, et al, J. Polym. Sci., Polym. Chem. Ed., 18, 2051–2059 (1980), disclose the homopolymerization of 3,4-epoxy-1-butene with borontrifluoride etherate, and they further disclose that the rate of termination is much faster than the rate of propagation, leaving much of the 3,4-epoxy-1-butene unreacted. The present invention differs from the above-cited prior art in a number of respects. For example, the novel polyether compounds of the present invention (1) are obtained by contacting 3,4-epoxy-1-butene and a nucleophilic initiator compound with a catalyst system comprising an onium iodide compound as cocatalyst, (2) contains residues derived from the nucleophilic initiator, and (3) comprise residues (1) and (2) wherein residue (2) constitutes a larger portion of the polyether product.

A few processes to obtain polymers comprising residue (2) have been disclosed. O. Ito, et al, Int. J. Chem. Kinet., 23(10), 853–860 (1991), disclose a flash photolysis evaluation of the initial stages of the reaction of an arylthiyl radical with 3,4-epoxy-1-butene and discuss the possibility of obtaining residue (2) by normal (C—O) and abnormal (C—C) cleavage of the oxirane ring. However, this paper presents no evidence of polymer formation, i.e., no polymer description or characterization is presented and the material disclosed in this paper is not a polymeric alcohol or glycol. S. R. Turner and R. Blevins disclose in U.S. Pat. Nos. 5,013,806, 5,071,930 and 5,071,931 the preparation of copolymers of 3,4-epoxy-1-butene and maleic anhydride by radical initiation wherein the copolymers contain a variety of 3,4-epoxy-1-butene-derived residues, including residue (2), that alternate with the maleic anhydride-derived diradical. K. B. Wagener, et al, Makromol. Chem., Rapid Commun., 13, 75–81 (1992), disclose the preparation of a polymer comprising only the trans-isomer of residue (2) by acyclic diene metathesis polymerization of diallyl ether and by ring-opening metathesis polymerization of 2,5-dihydrofuran. However, the polyethers prepared by this method are not alcohols or glycols.

Finally, U.S. Pat. No. 5,238,889 discloses a process for the separation of (i) an onium iodide compound, (ii) an organotin iodide compound, or (iii) a mixture thereof from a mixture of such compounds and an oligomer of 3,4-epoxy-1-butene. The oligomer referred to in U.S. Pat. No. 5,238,889 is formed during the manufacture of 2,5-dihydrofuran by the isomerization of 3,4-epoxy-1-butene. The polyether glycols and alcohols of the present invention differ from the oligomers described in the '889 patent in that the former contain residues of one or more hydroxy initiator compounds. The polymerization of 3,4-epoxy-1-butene in the presence of a hydroxy initiator compound, in addition to the onium iodide and organotin catalyst components, results in the formation of significantly more polyether compound than is normally obtained by the process disclosed in U.S. Pat. No. 5,238,889.

The polyether compounds provided by the present invention are comprised of n units of residue (1) and m units of residue (2), wherein (i) the total value of n+m is 2 to 70 and m/(n+m) is greater than 0.75 and up to 0.98, i.e., residue (2) constitutes greater than 75 mole percent and up to 98 mole percent of the total moles of residues (1) and (2), (ii) the polyether compounds comprise at least 1 weight percent of the residue of at least one organic initiator compound, and (iii) residues (1) and (2) have the structures:

and

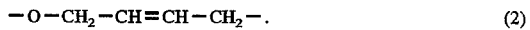

The polyether polymers are further characterized in that at least 95 percent of the terminal hydroxyl groups are primary (rather than secondary) hydroxyl groups. The primary hydroxyl groups (and thus the polymers) are more reactive for condensation reactions in general. The polyether compounds normally have a polydispersity value of less than 3, preferably in the range of 1 to 1.7 and most preferably in the range of 1 to 1.5. The polyether compounds may be used in the preparation or formulation of surfactants and other compositions analogous to compositions derived from known polyether polymers.

The polyether compounds of the present invention may be prepared by adding 3,4-epoxy-1-butene to a solution of the catalyst system and a nucleophilic hydroxyl initiator compound. A catalyst system that has been found to be especially effective comprises an onium iodide compound such as an ammonium or phosphonium iodide and an organotin compound such as a trihydrocarbyltin iodide. Thus, another embodiment of the present invention is a process for the preparation of a polyether polymer which comprises contacting 3,4-epoxy-1-butene with an organic initiator compound in the presence of a catalyst system comprising an onium iodide and an organotin iodide compound, wherein the polyether polymer is comprised of n units of residue (1) and m units of residue (2), wherein (i) the total value of n+m is 2 to 70 and m/(n+m) is greater than 0.75 and up to 0.98, (ii) the polyether compound comprises at least 1 weight percent of the residue of the organic initiator compound, and (iii) residues (1) and (2) have the structures:

and

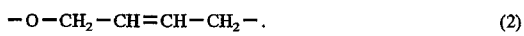

The onium iodide compound useful in the synthesis of the polyether compounds may be selected from a variety of tetra(hydrocarbyl)ammonium iodides and tetra(hydrocarbyl)phosphonium iodides, preferably having a total carbon atom content of about 16 to 72 carbon atoms. Such compounds have the formulas

and

wherein each $R^1$ substituent independently is selected from alkyl of up to about 20 carbon atoms and each $R^2$ substituent is independently selected from $R^1$, benzyl, phenyl or phenyl substituted with up to 3 substituents selected from lower alkyl, e.g., alkyl of up to about 4 carbon atoms, lower alkoxy or halogen; or two $R^1$ substituents collectively may represent alkylene of 4 to 6 carbon atoms including alkylene of 4 to 6 carbon atoms substituted with lower alkyl; provided, as specified above, that the quaternary iodide compounds contain about 16 to 72 carbon atoms. Specific examples of the onium iodide catalyst component include tetra-n-octylphosphonium iodide, tri-n-octyl(n-dodecyl)phosphonium iodide, tri-n-octyl(n-hexadecyl)phosphonium iodide, tri-n-octyl(n-octadecyl)phosphonium iodide, tetra-n-dodecylphosphonium iodide, tetra-n-hexadecylphosphonium iodide, tetra-n-octadecylphosphonium iodide, tetra-n-dodecylammonium iodide, tetra-n-hexadecylammonium iodide, and tetra-n-octadecylammonium iodide. The preferred onium iodides are tetra-n-alkylphosphonium iodides containing about 32 to 72 carbon atoms, especially compounds of formula (II) above wherein each $R^2$ is straight-chain alkyl of about 4 to 18 carbon atoms. Tetra-n-dodecylphosphonium iodide, tetra-n-hexadecylphosphonium iodide, and tri-n-octyl(n-octadecyl)phosphonium iodide are especially preferred.

The organotin catalyst component may be selected from organotin (IV) iodides such as hydrocarbyltin triiodides, di(hydrocarbyl)tin diiodides, and tri(hydrocarbyl)tin iodides. Examples of such organotin (IV) iodide compounds have the general formula

wherein each $R^3$ independently is selected from alkyl or substituted alkyl moieties having up to about 20 carbon atoms, cycloalkyl or substituted cycloalkyl having about 5 to 20 carbon atoms, carbocyclic aryl or substituted carbocyclic aryl having about 6 to 20 carbon atoms, or heteroaryl or substituted heteroaryl moieties having about 4 up to 20 carbon atoms; and n is 1, 2, or 3.

Specific examples of the organotin compounds include di-n-butyltin diiodide, tri-n-butyltin iodide, tri-n-octyltin iodide, triphenyltin iodide, trimethyltin iodide, n-butyltin triiodide, tricyclohexyltin iodide, tris(2-methyl-2-phenylpropyl)tin iodide, tribenzyltin iodide, dimethyltin diiodide, and diphenyltin diiodide. Other organotin halides such as chlorides and bromides may be used in the process wherein they are converted to the iodide compounds. The preferred organotin iodide compounds have the general formula:

wherein each $R^3$ independently is selected from alkyl having about 4 to 10 carbon atoms or phenyl.

The ratio of the onium iodide and organotin iodide components of the catalyst system can vary substantially depending, for example, upon the particular compounds used. Generally, the quaternary onium iodide:organotin iodide mole ratio is within the range of about 20:1 to 0.05:1. For the preferred catalyst system comprising a phosphonium iodide and an organotin iodide, a phosphonium iodide:organotin iodide mole ratio of about 5:1 to 0.2:1 is especially preferred.

We have discovered that a catalyst system comprising tris(2-methyl-2-phenylpropyl)tin iodide and tri-n-octyl(n-octadecyl)phosphonium iodide can be used advantageously to prepare the polyether ether compounds of the present invention having the highest m/(n+m) values, e.g., m/(n+m) values in the range of 0.90 to 0.98. Thus, a preferred process embodiment of the present invention is a process for the preparation of a polyether polymer which comprises contacting 3,4-epoxy-1-butene with an organic initiator compound in the presence of a catalyst system comprising tris(2-methyl-2-phenylpropyl)tin iodide and tri-n-octyl(n-octadecyl)phosphonium iodide, wherein the polyether polymer is comprised of n units of residue (1) and m units of residue (2), wherein (i) the total value of n+m is 2 to 70 and m/(n+m) is in the range of about 0.90 and 0.98, (ii) the polyether compound comprises at least 1 weight percent of the residue of the organic initiator compound, and (iii) residues (1) and (2) have the structures:

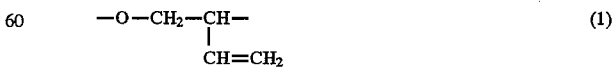

and

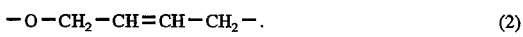

The organic initiator compound may be selected from a vast number and broad variety of mono- and poly-hydroxy compounds and carboxylic acids. The mono-hydroxy initiators include low molecular weight organic alcohols and polymeric alcohols which may be linear or branched chain, aliphatic, alicyclic, or aromatic. The mono-hydroxy initiators preferably are selected from alkanols containing up to about 20 carbon atoms. When an alcohol is used as the initiator, the polyether polymeric product obtained has a primary hydroxyl group on one end of the polymer chain and thus is a polymeric alcohol. The other end of the polymer chain is terminated with the residue of the alcohol initiator, e.g., a residue having the formula —$R^4$ wherein $R^4$ is the residue of an alcohol, preferably an alkyl group, containing up to about 20 carbon atoms. Although secondary or tertiary alcohols may be used, primary alcohols are preferred. Some typically useful alcohol initiators include methanol, ethanol, n-butanol, iso-butanol, 2-ethylhexanol, n-decanol, stearyl alcohol, cetyl alcohol, allyl alcohol, benzyl alcohol, phenol, and the like. The carboxylic acid initiators may be selected from aliphatic, cycloaliphatic and aromatic carboxylic acids containing up to about 12 carbon atoms. The use of a carboxylic acid as the initiator results in the formation of a glycol ether monoester.

The poly-hydroxy initiators contain 2 or more hydroxyl groups and may be monomeric or polymeric compounds. Examples of the poly-hydroxy initiators include ethylene glycol, 1,2-propanediol, 1,3-propanediol, 1,2-butanediol, 1,4-butanediol, 1,6-hexanediol, 1,4-cyclohexanediol, 1,4-cyclohexanedimethanol, 2,2-di-methyl-1,3-propanediol, 2,2,4-trimethyl-1,3-pentanediol, 2,2,4,4-tetramethyl-1,3-cyclobutanediol, 2-butene-1,4-diol, 1-butene-3,4-diol, hydroquinone, resorcinol, bisphenol-A, glycerol, trimethylolpropane, starch, sucrose, glucose, pentaerythritol, polyethylene glycol, poly-propylene glycol, polybutylene glycol, poly(tetramethylene ether) glycol, and hydroxy-terminated, low molecular weight polyesters. When a poly-hydroxy compound is used as the initiator, the polyether polymer typically grows from at least 2 of the hydroxy groups of the initiator and the subsequently-obtained polymer is a poly-hydroxy polymer. The residue of the poly-hydroxy initiators may be represented by the formula —O—$R^5$— wherein $R^5$ is the residue of a poly-hydroxy initiator. The diols having 2 to 6 carbon atoms constitute the preferred initiators.

The residues of the organic initiator compounds may constitute a minor or major portion of the molecular weight of the polyether polymers of the invention. For example, if a polymeric initiator, e.g. a hydroxyl-terminated polyoxyalkylene polymer, is employed and the number of repeat units of 3,4-epoxy-1-butene residue is relatively low, the initiator residue content of the polymer may be greater than 90 weight percent. On the other hand, if the initiator employed is a low molecular weight compound such as methanol or water, the initiator residue may constitute as low as one weight percent of the polymer. The polyether compounds typically comprise at least 80 weight percent, preferably at least 90 weight percent, 3,4-epoxy-1-butene residues.

The polymerization reaction normally is conducted in the absence of solvent. However, inert solvents such as hydrocarbons, chlorinated hydrocarbons, cyclic or acyclic ethers, and the like may be used if desired. Examples of such solvents include benzene, toluene, xylene, heptane, methylene chloride, chloroform, tetrahydrofuran, 2,5-dihydrofuran, and the like.

The process of the present invention may be carried out at temperatures in the range of about 40° C. to about 150° C., depending upon the choice of initiator, solvent, and catalyst. Temperatures of about 80° to 110° C. are preferred. Reaction pressure is not an important part of our novel process, and, therefore, the process typically is performed at approximately atmospheric pressure although pressure moderately above or below atmospheric may be used.

In the operation of our novel process, the primary reactant, 3,4-epoxy-1-butene is added to a mixture of an onium iodide compound, an organotin compound, and a nucleophilic initiator compound. The 3,4-epoxy-1-butene monomer may be added all at once or, preferably, slowly or in stepwise increments to a mixture of the catalyst and the initiator. Slow addition of 3,4-epoxy-1-butene is preferred for controlling the conversion, controlling the product molecular weight, and minimizing side reaction. Stepwise addition of the 3,4-epoxy-1-butene monomer gives stepwise increase in polymer molecular weight. Thus, molecular weight control is achieved by the stoichiometry of monomer to initiator. A wide variety of molecular weights may be achieved, but the molecular weights are generally controlled to provide polymers with molecular weights of about 500 to 3000 for use as condensation polymer intermediates.

The process of this invention may be carried out in a batch, semi-continuous, or continuous mode of operation. For example, batch operation may comprise slow addition of 3,4-epoxy-1-butene to a mixture of an onium iodide compound, an organotin compound, and a nucleophilic initiator compound, followed by removal of the volatile components from the reaction mixture by distillation and extraction of the catalyst system from the polyether product using a hydrocarbon extraction solvent. The catalyst is recovered from the extraction solvent by evaporation, and the recovered catalyst, which may contain a fraction of the polyether compound, is recycled to the reactor without further purification. The process co-produces 2,5-dihydrofuran which is a valuable compound useful, for example, in the manufacture of tetrahydrofuran.

Our novel polyether compounds preferably are comprised of n units of residue (1) and m units of residue (2), wherein the total value of n+m is about 7 to 50, and m/(n+m) is about 0.85 to 0.98. The preferred polymers contain from about 5 to 20 weight percent, based on the weight of the polyether compound, of hydroxy initiator residues, preferably residues having the formula —O—$R^5$—wherein $R^5$ is alkylene of 2 to 6 carbon atoms. The polymers are still further characterized in that at least 95 percent of the polymer segments of residues (1) and (2) are terminated with primary (rather than secondary) hydroxyl end groups. The primary hydroxyl groups (and thus the polymers) are more reactive for condensation polymerization reactions in general. The polyether compounds normally have a polydispersity value of less than 3, preferably in the range of 1 to 1.7 and most preferably in the range of 1 to 1.5. The polyether compounds wherein the total value of n+m is about 10 to 30 are particularly preferred.

The preparation of the novel polyether compounds of the present invention and the operation of the process are further illustrated by the following example. Proton NMR spectra are obtained on a Varian Gemini 300 MHz spectrometer with samples dissolved in deuterated chloroform containing tetramethylsilane as an internal standard. The value of m/(n+m) is determined by comparison of the integrated proton NMR absorptions of residues (1) and (2). Number average molecular weights ($M_w/M_n$) are determined using size-exclusion chromatography with refractive index detection in tetrahydrofuran using four 10 µm PLgel mixed-bed columns and calibrated using narrow molecular weight distribution polystyrene standards. Hydroxyl numbers are determined from titration of the acetic acid formed by the reaction of the sample with acetic anhydride. Distillates are analyzed by gas chromatography on a Hewlett-Packard 5890A gas chromatograph with a DB5-30W capillary column; temperature program 35° C. (4.5 minutes), 20° C./minute to 260° C. (hold 6 minutes). J-resolved NMR and $^{13}$C NMR analyses are obtained from a Jeol 400 MHz NMR spectrometer.

EXAMPLE

Tris(2-methyl-2-phenylpropyl)tin iodide [also known as trineophyltin iodide] (33.8 g), tri-n-octyl(n-octadecyl) phosphonium iodide (39.0 g), and 1,4-butanediol (10.0 g) are placed in a 250-mL, four-neck, round-bottom flask equipped with a thermocouple, magnetic stirrer, distillation head, oil heating bath, and reactant feed tube. The mixture is heated to 110° C., and the 3,4-epoxy-1-butene addition is begun. A total of 816 g of 3,4-epoxy-1-butene is added over 44 hours. The pressure within the flask is gradually lowered to about 100 torr to completely distill the volatile components from the catalyst/polyether polymer residue. A total of 648.5 g of distillate is collected (79.5% weight recovery). The composition of the distillate is 21.1% 3,4-epoxy-1-butene, 75.3% 2,5-dihydrofuran, and 3.6% crotonaldehyde.

The catalyst/polyether polymer residue and 200 mL of heptane are added to a 500-mL, jacketed, glass vessel equipped with a mechanical stirrer, thermocouple, and bottom stopcock and the mixture is agitated and heated to 65°–75° C. by circulating heated glycol/water from a constant temperature bath to the jacket. Stirring is discontinued, and the mixture is allowed to settle. The layers are separated, and the bottom polyether polymer layer is extracted again with 200 mL of heptane then once more with 100 mL of heptane. The heptane layers containing the extracted catalyst are combined, and the solvent is removed by rotary vacuum evaporation (up to about 70° C. and 30 torr) to give a catalyst-containing material (80.3 g) with the following approximate composition by weight: 31.1% tris(2-methyl-2-phenylpropyl)tin iodide, 54.9% tri-n-octyl(n-octyldecyl) phosphonium iodide, and 13.9% polyether polymer. The recovered catalyst mixture can be returned to the reaction flask for continued cycles of polymerization and catalyst separation. After removal of residual volatile material by rotary vacuum evaporation (up to about 70° C. and 30 torr) the polyether polymer layer weighs 149.4 g (18.3% yield) and has n+m equal to about 11, m/(n+m)=0.94, and $M_w/M_n$=1.59. J-resolved NMR and $^{13}$C NMR analyses of the polyether polymer product in deuterated acetone show no evidence of secondary hydroxyl carbons.

The invention has been described in detail with particular reference to preferred embodiments thereof, but it will be understood that variations and modifications will be effected within the spirit and scope of the invention.

We claim:

1. Process for the preparation of a polyether polymer with terminal primary hydroxyl groups which comprises contacting 3,4-epoxy-1-butene with an hydroxyl organic initiator compound in the presence of a catalyst system comprising an onium iodide and an organotin iodide compound, wherein (i) the polyether polymer is comprised of n units of residue (1) and m units of residue (2), wherein the total value of n+m is 2 to 70 and m/(n+m) is greater than 0.75 and up to 0.98, (ii) the polyether compound comprises at least 1 weight percent of the residue of the hydroxyl organic initiator compound, and (iii) residues (1) and (2) have the structures:

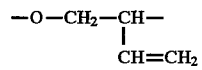 (1)

and

 (2)

and at least 95 percent of the terminal hydroxyl groups are primary hydroxyl groups.

2. Process according to claim 1 wherein the process is carried out at a temperature of about 40° to 150° C.; the organic initiator compound is selected from the group consisting of mono-hydroxy alcohol and poly-hydroxy initiator compounds; the onium iodide compound is a tetra (hydrocarbyl)ammonium iodide or a tetra(hydrocarbyl) phosphonium iodides having a total carbon atom content of about 16 to 72 carbon atoms and formula:

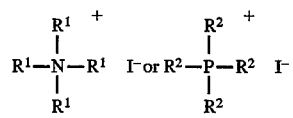

wherein each R$^1$ substituent independently is selected from alkyl of up to about 20 carbon atoms and each R$^2$ substituent is independently selected from R$^1$, benzyl, phenyl or phenyl substituted with up to 3 substituents selected from lower alkyl, lower alkoxy or halogen; or two R$^1$ substituents collectively may represent alkylene of 4 to 6 carbon atoms including alkylene of 4 to 6 carbon atoms substituted with lower alkyl; and the organotin iodide compound has the formula:

wherein each R$^3$ independently is selected from alkyl or substituted alkyl moieties having up to about 20 carbon atoms, cycloalkyl or substituted cycloalkyl having about 5 to 20 carbon atoms, carbocyclic aryl or substituted carbocyclic aryl having about 6 to 20 carbon atoms, or heteroaryl or substituted heteroaryl moieties having about 4 up to 20 carbon atoms; and n is 1, 2, or 3.

3. Process for the preparation of a polyether polymer with terminal primary hydroxyl groups which comprises contacting 3,4-epoxy-1-butene with an hydroxyl organic initiator compound in the presence of a catalyst system comprising tris(2-methyl-2-phenylpropyl)tin iodide and tri-n-octyl(n-octadecyl)phosphonium iodide, wherein the polyether polymer is comprised of n units of residue (1) and m units of residue (2), wherein (i) the total value of n+m is 2 to 70 and m/(n+m) is in the range of about 0.90 and 0.98, (ii) the polyether compound comprises at least 1 weight percent of the residue of the hydroxyl organic initiator compound, and (iii) residues (1) and (2) have the structures:

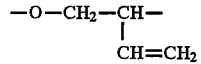 (1)

and

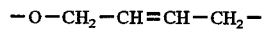 (2)

and at least 95 percent of the terminal hydroxyl groups are primary hydroxyl groups.

4. Process according to claim 3 carried out at a temperature of about 40° to 150° C. wherein the mole ratio of the tri-n-octyl(n-octadecyl)phosphonium iodide to tris(2-methyl-2-phenylpropyl)tin iodide is about 20:1 to 0.05:1 and the organic initiator compound is selected from mono-hydroxy alcohol and poly-hydroxy initiator compounds.

5. Process for the preparation of a polyether polymer with terminal primary hydroxyl groups which comprises contacting at 80° to 110° C. 3,4-epoxy-1-butene with an hydroxyl organic initiator compound in the presence of a catalyst system comprising tris(2-methyl-2-phenylpropyl)tin iodide and tri-n-octyl(n-octadecyl)phosphonium iodide, the polyether polymer is comprised of n units of residue (1) and m units of residue (2), wherein (i) the total value of n+m is 7 to 50 and m/(n+m) is in the range of about 0.90 and 0.95, (ii) the polyether compound comprises about 5 to 20 weight percent of residues of the formula —O—$R^5$—wherein $R^5$ is alkylene of 2 to 6 carbon atoms, (iii) residues (1) and (2) constitute at least 90 weight percent of the polymer, (iv) at least 95 percent of the terminal hydroxyl groups are primary hydroxy groups, (v) the polymer has a polydispersity value of 1 to 1.7, (vi) the mole ratio of the tri-n-octyl(n-octadecyl)phosphonium iodide to tris(2-methyl-2-phenylpropyl)tin iodide is about 5:1 to 0.02:1, and (vii) residues (1) and (2) have the structures:

 (1)

and

 (2)

* * * * *